US009355475B1

(12) United States Patent
Grenier et al.

(10) Patent No.: US 9,355,475 B1
(45) Date of Patent: May 31, 2016

(54) SYSTEMS AND METHODS FOR TEMPORALLY REPROJECTING REFLECTION DATA

(71) Applicant: Autodesk, Inc., San Rafael, CA (US)

(72) Inventors: Jean-Philippe Grenier, Montreal (CA); Olivier Dionne, Montreal (CA); Cornelis Rijnen, Cote Saint-Luc (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/634,631

(22) Filed: Feb. 27, 2015

(51) Int. Cl.
*G06K 9/00* (2006.01)
*G06T 11/00* (2006.01)
*G06T 7/00* (2006.01)
*G06T 7/20* (2006.01)

(52) U.S. Cl.
CPC ............. *G06T 11/006* (2013.01); *G06T 7/0044* (2013.01); *G06T 7/0071* (2013.01); *G06T 7/2006* (2013.01); *G06T 2207/10028* (2013.01); *G06T 2207/20021* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 6,697,062 B1 * | 2/2004 | Cabral | ..................... | G06T 15/04 345/419 |
| 7,825,937 B1 * | 11/2010 | Sakhartchouk | ....... | G06T 15/503 345/426 |
| 9,111,377 B2 * | 8/2015 | Watanabe | .......... | H04N 13/0007 |

OTHER PUBLICATIONS

Sebastien et al., "Local image-based lighting with parallax-corrected cubemaps", SIGGRAPH '12, Aug. 5-9, 2012.*
Ganestam et al., "Real-time multiply recursive reflections and refractions using hubrid rendering", published online online on Sep. 23, 2014.*
"Fermat's Principle," [online] [Retrieved on Feb. 17, 2015]; Retrieved from the Internet URL: http://scienceworld.wolfram.com/physics/FermatsPrinciple.html>, 1 page.
Mattausch et al, "High-quality Screen-space Ambient Occlusion using Temporal Coherence," Computer Graphics Forum, 2009, 28(4):1-12.
Valient, "Reflections and Volumetrics of Killzone Shadow Fall," Presentation at the 2014 Game Developers Conference in San Francisco, CA, 74 pages.

(Continued)

*Primary Examiner* — Soo Park
(74) *Attorney, Agent, or Firm* — Fish & Richardson P.C.

(57) ABSTRACT

An example method includes, responsive to identifying an object and a reflection surface: identifying a reflection incidence point on a current position of the reflection surface; reprojecting the reflection incidence point using a surface motion vector of the reflection incidence point to determine a previous reflection incidence point. The previous reflection incidence point is a reflection incidence point on a previous position of the reflection surface. The method further includes, reprojecting a reflected point (a reflection of the object in accordance with the reflection surface's current position) using a motion vector to determine a previous location of the reflected point on the previous position of the reflection surface; projecting a current view point onto the previous position of the reflection surface to produce a previous view point; and presenting to a user a presentation of the previous location of the reflected point on the previous position of the reflection surface.

20 Claims, 7 Drawing Sheets

Reflection area 602    Integration into a temporal reprojection pipeline    Reflection area 604

(56) References Cited

OTHER PUBLICATIONS

Wronski, "Volumetric Fog: Unified Compute Shader-Based Solution to Atmospheric Scattering," Presentation at SIGGRAPH, the 41$^{st}$ International Conference and Exhibition on Computer Graphics and Interactive Techniques, Aug. 2014, Vancouver, BC, Canada, 67 pages.

Yang et al., "Amortized Supersampling," [online] [Retrieved on Feb. 26, 2015]; Retrieved from the Internet URL: http://www.cs.virginia.edu/~gfx/pubs/Yang_2009_AMS/yang2009.pdf, 12 pages.

* cited by examiner

200

202 Responsive to identifying an object and a reflection surface, which reflects an image of the object to a view point:

204 Identify a reflection incidence point on a current position of the reflection surface and being associated with a point on the object being reflected to the view point

206 Identify a first surface motion vector associated with the reflection incidence point

208 Reproject the reflection incidence point using the first surface motion vector to determine a previous reflection incidence point associated with the point on the object.
The previous reflection incidence point is a reflection incidence point on a previous position of the reflection surface and being associated with the point on the object being reflected to the view point.

210 Identify a second motion vector corresponding to a reflected point wherein the reflected point is a reflection of the object in accordance with the current position of the reflection surface

212 Reproject the reflected point using the second motion vector to determine a previous location of the reflected point on the previous position of the reflection surface

214 Project a current view point onto the previous positon of the reflection surface to produce a previous view point

216 Determine a presentation of the previous location of the reflected point on the previous position of the reflection surface.
Present to a user the presentation of the previous location of the reflected point.

Figure 2

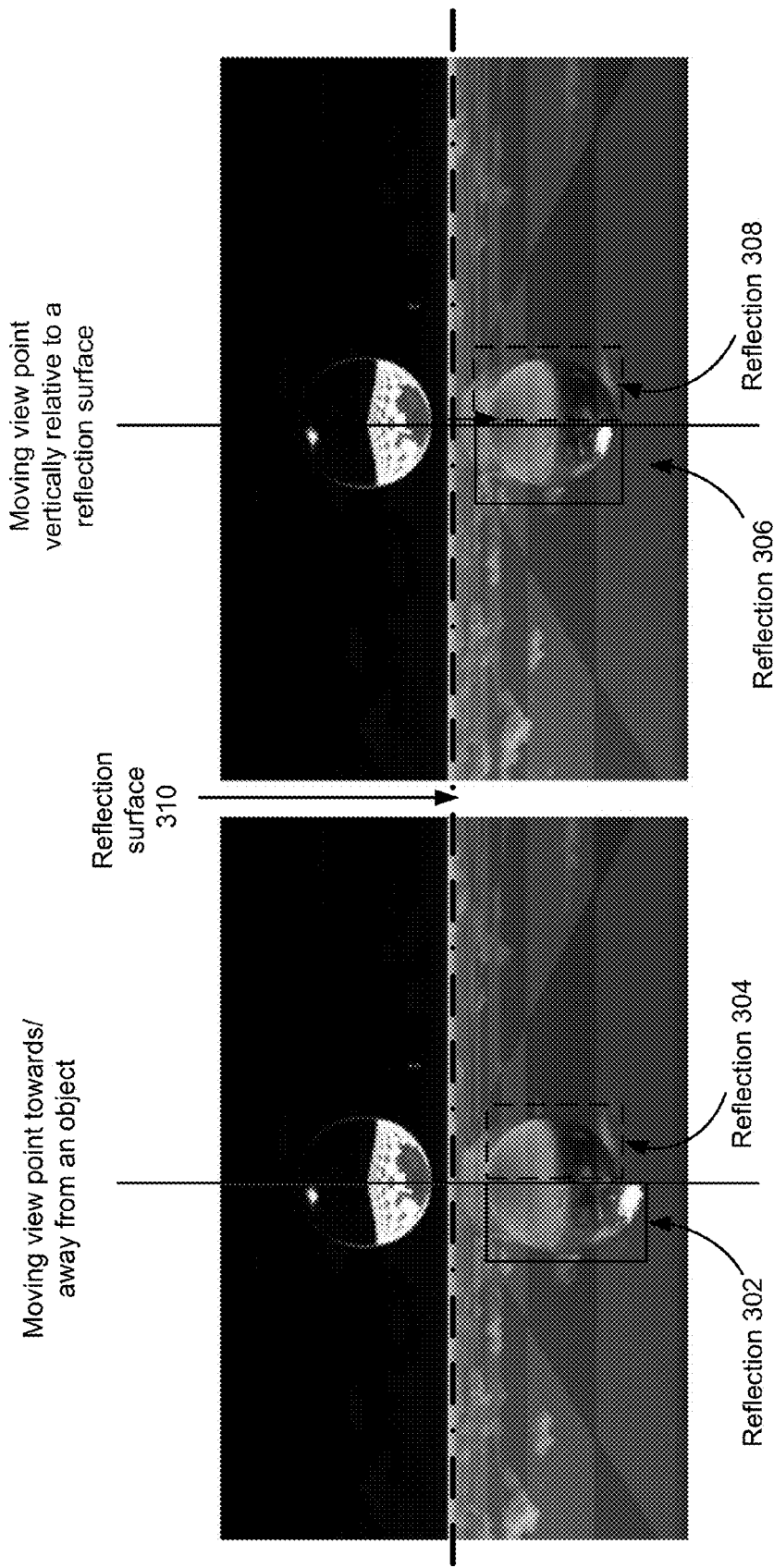

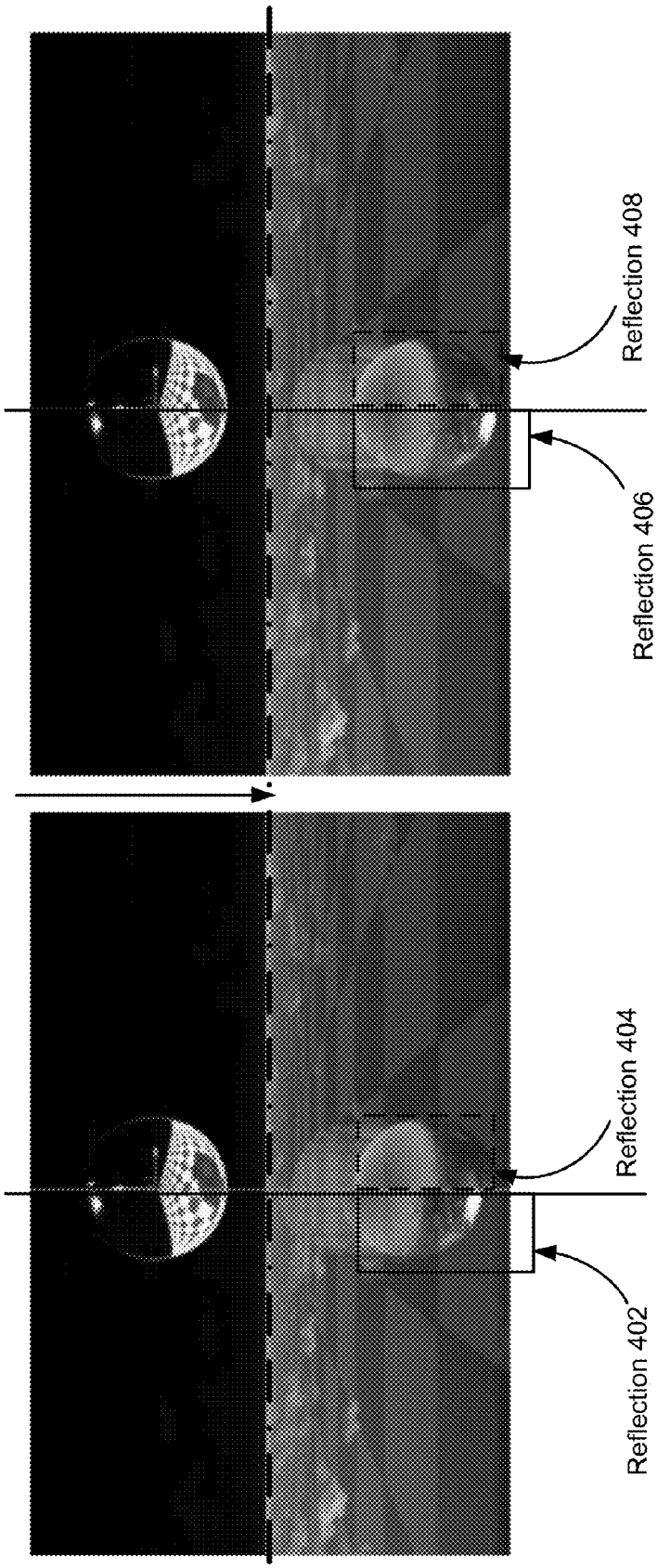

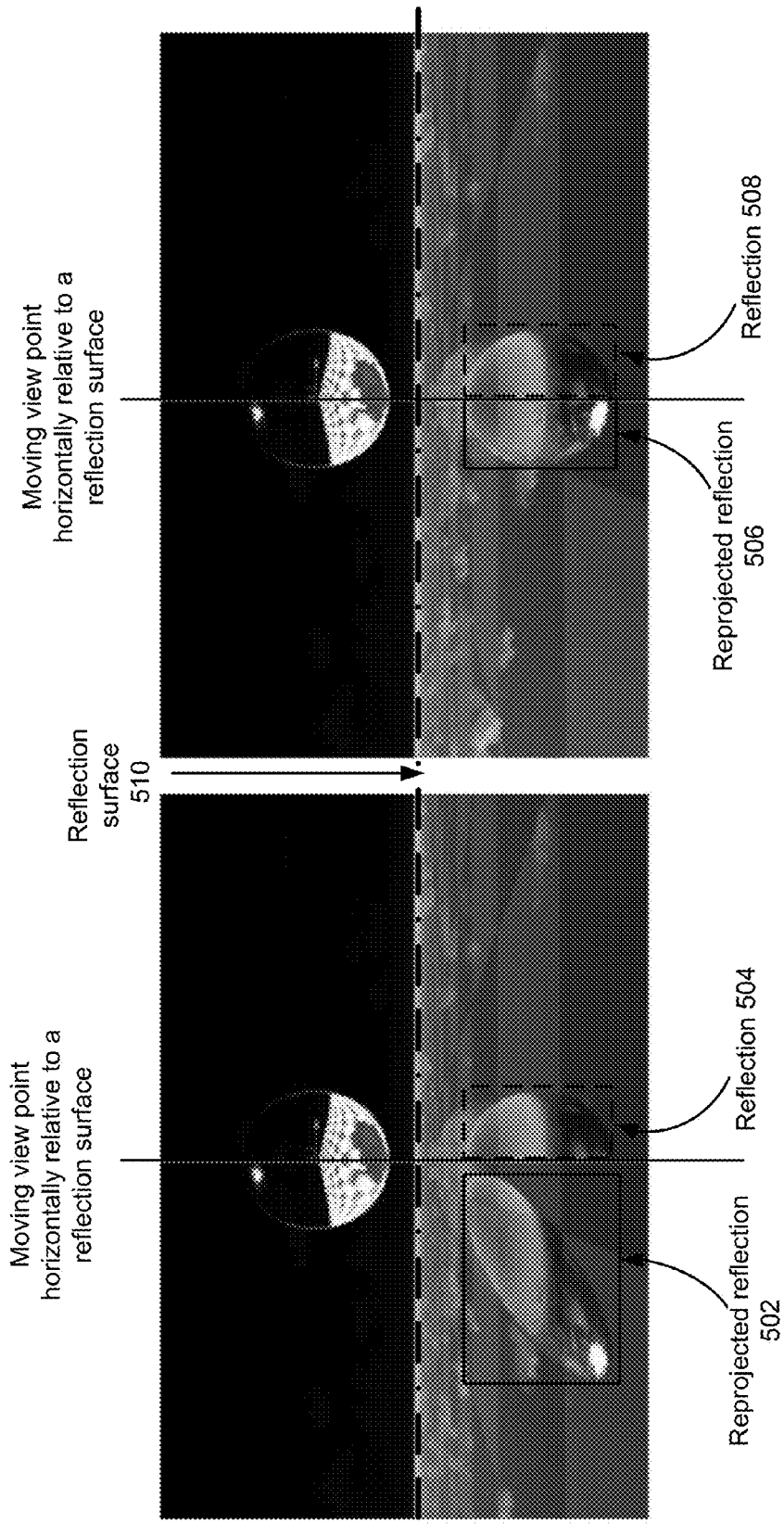

Integration into a temporal reprojection pipeline

SYSTEMS AND METHODS FOR TEMPORALLY REPROJECTING REFLECTION DATA

TECHNICAL FIELD

The implementations disclosed herein relate generally to image processing.

BACKGROUND

In computer graphics areas, temporal reprojection is a useful technique for real time object rendering, including rendering in reflection scenes.

Difficulties abound, however. One technical problem is that temporal reprojection sometimes assumes that pixel features would move in the same direction and at the same speed as indicated by a calculated motion vector for a given pixel. These assumptions may fail in reflection scenes, because reflections depend on not only the position of the reflection surface, but also a viewer's view point. Therefore, conventional temporal reprojection techniques may cause artifacts, such as trailing or ghosting, in reflection scenes.

The above identified technical problems are reduced or eliminated by the systems and methods disclosed herein.

SUMMARY

Technical solutions (e.g., computing systems, methods, and non-transitory computer readable storage mediums) for applying temporal reprojection to reflection data are provided in the present disclosure.

In some implementations, a method for applying a temporal reprojection to reflection data includes, responsive to identifying an object and a reflection surface: identifying a reflection incidence point on a current position of the reflection surface and being associated with a point on the object being reflected to the view point; identifying a first surface motion vector associated with the reflection incidence point; and reprojecting the reflection incidence point using the first surface motion vector to determine a previous reflection incidence point associated with the point on the object. The reflection surface reflects an image of the object to a view point. The previous reflection incidence point is a reflection incidence point on a previous position of the reflection surface and being associated with the point on the object being reflected to the view point.

The method also includes, identifying a second motion vector corresponding to a reflected point wherein the reflected point is a reflection of the object in accordance with the current position of the reflection surface; reprojecting the reflected point using the second motion vector to determine a previous location of the reflected point on the previous position of the reflection surface; projecting a current view point onto the previous position of the reflection surface to produce a previous view point; determining a presentation of the previous location of the reflected point on the previous position of the reflection surface; and presenting to a user the presentation of the previous location of the reflected point.

In some implementations, the method further includes, determining the previous location of the reflected point on the previous position of the reflection surface in accordance with the previous view point and the previous location of the reflected point on the previous position of the reflection surface.

In some implementations, the method further includes, determining the previous location of the reflected point on the previous position of the reflection surface using a Fermat's principal.

In some implementations, reprojecting the reflection incidence point using the first surface motion vector to determine a previous reflection incidence point associated with the point on the object comprises: reprojecting the reflection incidence point using the first surface motion vector; and reconstructing the previous reflection incidence point using a depth buffer history.

In some implementations, reprojecting the reflected point using the second motion vector to determine a previous location of the reflected point on the previous position of the reflection surface comprises: reconstructing the previous location of the reflected point using the depth buffer history.

In some implementations, the method further includes, reconstructing a previous surface normal of the reflection incidence point using a previous view matrix transformation; and determining the previous position of the reflection surface using the previous surface normal of the reflection incidence point and the previous reflection incidence point.

In some implementations, determining a presentation of the previous location of the reflected point on the previous position of the reflection surface comprises: evaluating the previous location of the reflected point in a previous reflection buffer using a previous view projection matrix.

In some implementations, the view point is a camera position.

In some implementations, the reflection surface is a screen space reflection surface.

In some implementations, the one or more steps described above are performed by a video game engine.

In other aspects of the present disclosure, computing systems and non-transitory computer storage mediums for executing one or more steps of the above-described methods are also disclosed.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 2 is a flow chart illustrating an example method for applying temporal reprojection to reflection data.

FIGS. 3A-3B are block diagrams illustrating example first comparisons of reflections rendered by different temporal reprojection techniques.

FIGS. 4A-4B are block diagrams illustrating example second comparisons of reflections rendered by different temporal reprojection techniques.

FIGS. 5A-5B are block diagrams illustrating example third comparisons of reflections rendered by different temporal reprojection techniques.

DETAILED DESCRIPTION

The implementations described herein provide various technical solutions to reduce visual artifacts in reflection scenes, and in particular to the above-identified problems among others by taking into account (1) position of the reflection surface and (2) a viewer's viewing position/angle, when applying temporal reprojection to a pixel in reflection scenes.

Additional details of implementations are now described in relation to the Figures.

Figure 1:
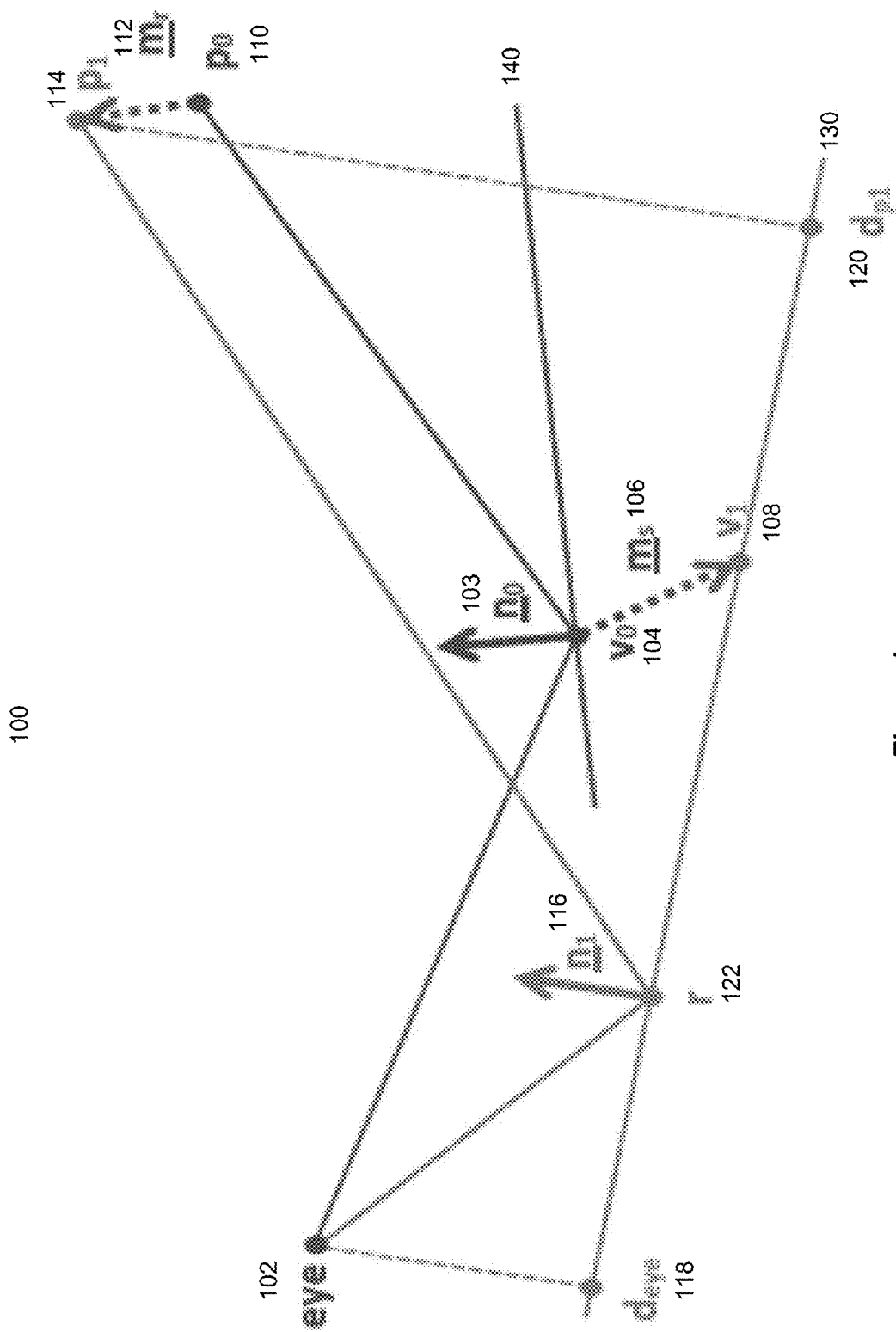
FIG. 1 is a block diagram illustrating an example method for applying temporal reprojection to reflection data.

FIG. 1 is a block diagram illustrating an example method for applying temporal reprojection to reflection data in accordance with some implementations.

As a non-limiting example, to render a reflection scene (e.g., moving camera positions towards or away from a ball, which has a reflection in a mirror), a camera's viewpoint is considered, as is the position or movement of the mirror.

For example, given the current position 140 of the mirror and the current camera position 102, a current position v0 104 of the reflection incidence point can be determined.

The previous position of the reflection incidence point can be determined. The surface motion vector ms 106 corresponding to the current position v0 104 of the reflection incidence point is retrieved, and the current position v0 104 of the reflection incidence point is reprojected using the surface motion vector ms 106. Based on a depth buffer history, a previous position v1 108 of the reflection incidence point can be reconstructed.

In some cases, a depth buffer contains per-pixel floating-point data for the z depth of each pixel rendered. In some cases, a depth buffer also includes stencil data which can be used to do more complex rendering such as simple shadows or outlines. When a pixel is rendered, depth data (as well as color data) can be captured and stored in a depth buffer.

In some cases, the previous position v1 108 is reconstructed by subtracting a motion vector from a current position of a point. For example, a pixel's previous position can be reconstructed or determined by subtracting, form a pixel's current position, distance the pixel's has traveled or moved between the previous position and the current position. A pixel's travel distance can be determined by multiplying the pixel's motion vector with the pixel's travel time between the pixel's previous position and the pixel's current position.

The previous position of the reflected point is determined. The current position p0 110 of the reflected point can be determined based on the current position v0 104 of the reflection incidence point, the current camera position 102, and the current position 140 of the reflection surface.

The motion vector mr 112 corresponding to the current position p0 110 of the reflected point is retrieved, and the reflected point p0 is reprojected using the motion vector mr 112. Also based on the depth buffer history, a previous position p1 114 of the reflected point is then reconstructed.

Using a previous view matrix transformation, a previous surface normal of the incidence point n1 116 can be determined based on the current surface normal n0 103.

In some cases, a view transformation matrix describes a transformation that transforms objects within a world space to a view space. For example, an object's coordinates in a world space can be multiplied by a view transformation matrix to produce the object's coordinates in a view space. In some cases, a previous view transformation transforms an object's previous position (e.g., positions in the last frame) from a world space to a view space.

As used in this disclosure, a world transform (or sometimes referred to as the object transform or model matrix) transforms an object within an object space into a world space. An object space specifies object (and pixels representing the object) in a coordinates system without references (e.g., spatial relationships) to other objects. A world space specifies not only objects (e.g., shape) using coordinates, but also spatial relationships between these objects, e.g., the position, orientation (and sometimes scale). For example, after a world transformation, an object would be displayed relative another object (e.g., adjacent to, above, below, near, or at a predefined distance from the object) in the same world view.

In some cases, a view transformation transforms an object within a world space into a view space or camera space (e.g., a space that is relative to the view of the camera). That is, how an object would look like from a particular view of a camera. For example, what portions of a car would be shown if the camera is positioned in the middle of the front hood and in front of the car windshield. In some cases, a view transformation transforms is carried out by multiplying an object's coordinates in a world space by a view transformation matrix.

In some cases, a projection transformation transforms an object's 3 dimensional coordinates in a view space to a 2 dimensional clip space. For example, how a car, which is a 3 dimensional object, would look like on when printed on a piece of paper, which is offers only 2 view dimensions. In some cases, a project transformation transforms is carried out by multiplying an object's coordinates in a view space by a projection matrix.

A previous plane 130 can be determined using the surface normal n1 116 and the previous position 108 of the reflection incidence point v1. In some cases, the previous plane 130 represents a previous position of the reflection surface.

The camera position (or view point) 102 is then projected to the previous plane 130 to generate a projected camera position Deye 118; the reconstructed reflected point p1 114 is also projected to the previous plane 130 to generate a projected reflected point position dp1 120.

Using both the projected camera position Deye 118 and the projected reflected point position dp1 120, and in accordance with the Fermat's principle (e.g., the path taken between two points by a ray of light is the path that can be traversed in the least time), a previous position of reflection point r 122 can be ascertained.

Using the previous view projection matrix, the previous position of reflection point r 122 can be evaluated in the previous reflection buffer. In some cases, the evaluation process, includes moving from a camera space (a 3 dimensional position) to a clip space (a 2 dimensional position). In some cases, moving from a camera space to a clip space is achieved multiplying a 3 dimensional position with a projection matrix. In some cases, because a 3 dimensional position comes from a previous frame, the 3 dimensional position is multiplied with the previous projection matrix to resolve it in the previous buffer.

The methods provided herein thus do not require that pixel features are moving in the same direction and at the same speed as the calculated motion vectors. Instead, positions (e.g., current and previous) of the reflection surface are taken into account, as are camera positions. These techniques can produce more accurate reflections through time by reducing unstable or noise signals and visual artifacts resulted therefrom.

FIG. 2 is a flow chart illustrating an example method 200 for applying temporal reprojection to reflection data in accordance with some implementations.

In some implementations, the method 200 includes, responsive to identifying (202) an object and a reflection surface that reflects an image of the object to a view point: identifying (204) a reflection incidence point on a current position of the reflection surface and being associated with a point on the object being reflected to the view point; identifying (206) a first surface motion vector associated with the reflection incidence point; and reprojecting (208) the reflection incidence point using the first surface motion vector to determine a previous reflection incidence point associated with the point on the object. The previous reflection incidence point is a reflection incidence point on a previous position of the reflection surface and being associated with the point on the object being reflected to the view point.

The method also includes, identifying (210) a second motion vector corresponding to a reflected point wherein the reflected point is a reflection of the object in accordance with the current position of the reflection surface; reprojecting (212) the reflected point using the second motion vector to determine a previous location of the reflected point on the previous position of the reflection surface; projecting (214) a current view point onto the previous position of the reflection surface to produce a previous view point; determining (216) a presentation of the previous location of the reflected point on the previous position of the reflection surface; and presenting to a user the presentation of the previous location of the reflected point.

In some implementations, the method further includes, determining the previous location of the reflected point on the previous position of the reflection surface in accordance with the previous view point and the previous location of the reflected point on the previous position of the reflection surface.

In some implementations, the method further includes, determining the previous location of the reflected point on the previous position of the reflection surface using a Fermat's principal.

In some implementations, reprojecting the reflection incidence point using the first surface motion vector to determine a previous reflection incidence point associated with the point on the object comprises: reprojecting the reflection incidence point using the first surface motion vector; and reconstructing the previous reflection incidence point using a depth buffer history.

In some implementations, reprojecting the reflected point using the second motion vector to determine a previous location of the reflected point on the previous position of the reflection surface comprises: reconstructing the previous location of the reflected point using the depth buffer history.

In some implementations, the method further includes, reconstructing a previous surface normal of the reflection incidence point using a previous view matrix transformation; and determining the previous position of the reflection surface using the previous surface normal of the reflection incidence point and the previous reflection incidence point.

In some implementations, determining a presentation of the previous location of the reflected point on the previous position of the reflection surface comprises: evaluating the previous location of the reflected point in a previous reflection buffer using a previous view projection matrix.

In some implementations, the view point is a camera position.

In some implementations, the reflection surface is a screen space reflection surface.

In some implementations, the one or more steps described above are performed by a video game engine.

FIGS. 3A-3B are block diagrams illustrating example comparisons of reflections rendered by different temporal reprojection techniques in accordance with some implementations.

As shown in FIGS. 3A and 3B, a camera point may be moved towards to and away from an object, respectively. Based on the movements of the camera point, pixel features are temporally reprojected and reflection data rendered. As can be seen in the left portion of the FIG. 3A, visual artifacts are present in the reflection 302 when the above-described method for applying temporal reprojection to reflection data is not applied; and in contrast, visual artifacts are not present or reduced in the reflection 304 when the above-described method is applied. As seen in the left portion of the FIG. 3A, the reflected image of the object is displayed with visible shape distortions.

FIGS. 4A-4B are block diagrams illustrating example comparisons of reflections rendered by different temporal reprojection techniques in accordance with some implementations.

As shown in FIGS. 4A-4B, a camera point may be moved vertically relative to a reflection surface. For example, a camera point may be moved up and down above the reflection surface.

Based on these movements of the camera point, pixel features are temporally reprojected and reflection data rendered. As can be seen in the left portion of the FIG. 4A, visual artifacts are present in the reflection 402 when the above-described method for applying temporal reprojection to reflection data is not applied; and in contrast, visual artifacts are not present or reduced in the reflection 404 when the above-described method is applied. As seen in the left portion of the FIG. 4A, the reflected image of the object is displayed with visible delay compared to the movement of the camera point.

Similarly, as can be seen in the right portion of the FIG. 4B, visual artifacts are present in the reflection 406 when the above-described method for applying temporal reprojection to reflection data is not applied; and in contrast, visual artifacts are not present or reduced in the reflection 408 when the above-described method is applied. As seen in the left portion of the FIG. 4B, the reflected image of the object is displayed with visible shape distortion; while, as seen in the right portion of the FIG. 4B, the reflected image of the object is displayed substantially free of shape distortion.

FIGS. 5A-5B block diagrams illustrating example comparisons of reflections rendered by different temporal reprojection techniques in accordance with some implementations.

As shown in FIGS. 5A-5B, a camera point may be moved horizontally relative to a reflection surface. For example, a camera point may be moved left and right relative to the object (and its reflected image).

Based on these movements of the camera point, pixel features are temporally reprojected and reflection data rendered. As can be seen in the left portion of the FIG. 5A, visual artifacts are present in the reflection 502 when the above-described method for applying temporal reprojection to reflection data is not applied; and in contrast, visual artifacts are not present or reduced in the reflection 504 when the above-described method is applied.

As seen in the left portion of the FIG. 5A, the reflected image of the object is displayed with significant shape distortions.

Figure 6:
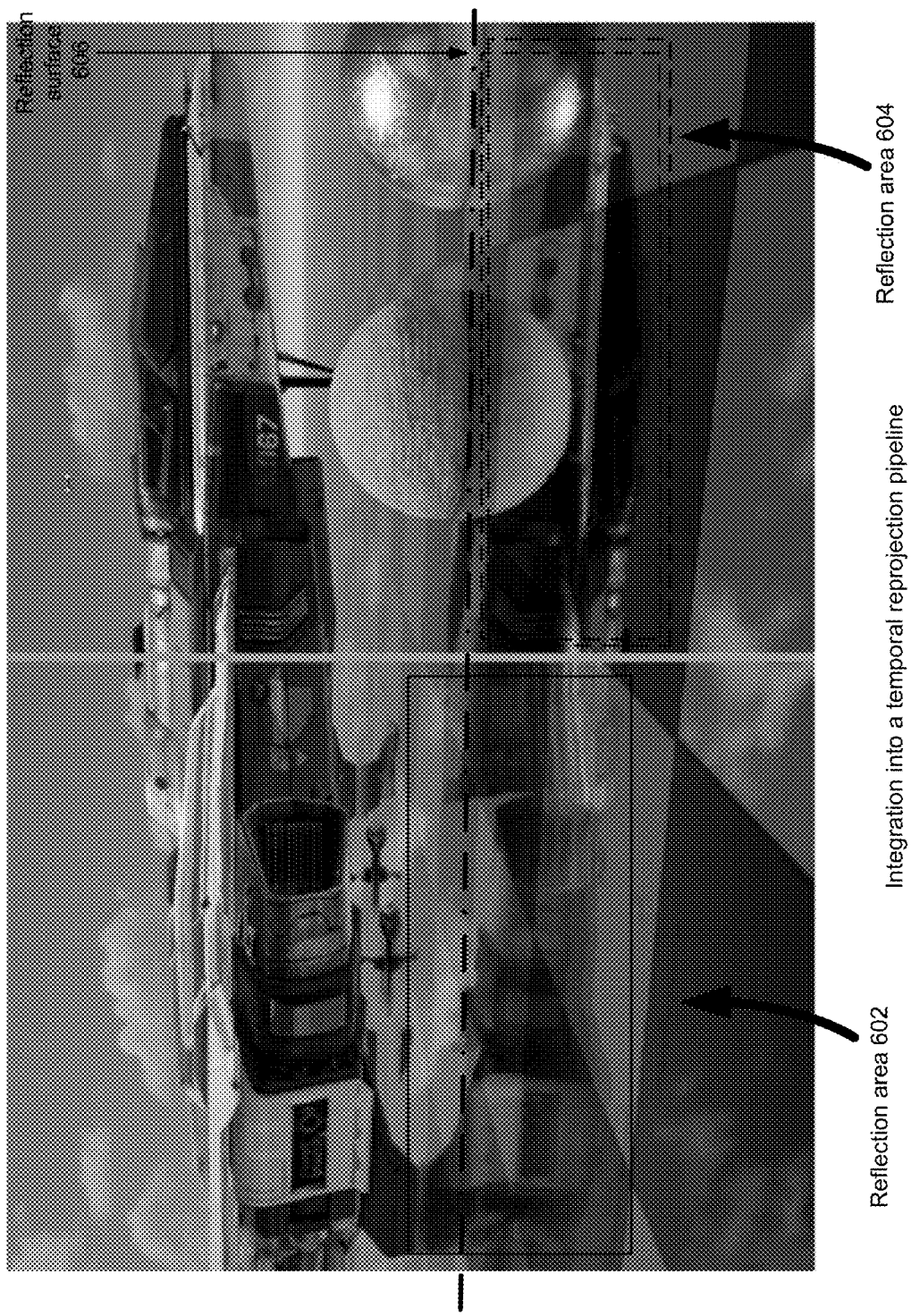
FIG. 6 is a block diagram illustrating example fourth comparisons of reflections rendered by integrating different temporal reprojection techniques.

FIG. 6 is a block diagram illustrating an example fourth comparison of reflections rendered by different temporal reprojection techniques in accordance with some implementations.

FIG. 6 shows comparisons of screen space reflections rendered with and without the benefit of the above-describe method. In some cases, screen space reflections are difficult to rendered using temporal reprojection techniques. Because, due to limited pixel variations between different (e.g., consecutive) frames or significant variations between neighboring pixels, unstable and noise signals often result when temporal reprojection is applied.

Difficulties relating to rendering screen space reflections using temporal reprojection techniques are exacerbated by the fact that screen space reflection are often rendered at a reduced (e.g., half) resolution, which often further destabilizes the reprojection process. These resulting visual artifacts make the above-described techniques more desirable in space screen reflection scenes.

As shown in FIG. 6, the above-describe method can be integrated into temporal reprojection pipeline to reduce visual artifacts.

As can be seen in the left portion of FIG. 6, visual artifacts are present in the reflection 602 when the above-described method for applying temporal reprojection to reflection data is not applied; and in contrast, visual artifacts are not present or reduced in the reflection 604 when the above-described method is applied.

As seen in the left portion of FIG. 6, the reflected image of the object is displayed with some ghost artifacts in the reflection are 602.

In contrast, visual artifacts are not present or reduced in the reflection 604 when the above-described method is applied.

In other cases, the above-described method can also reduce trailing artifacts in the reflected image.

Figure 7:
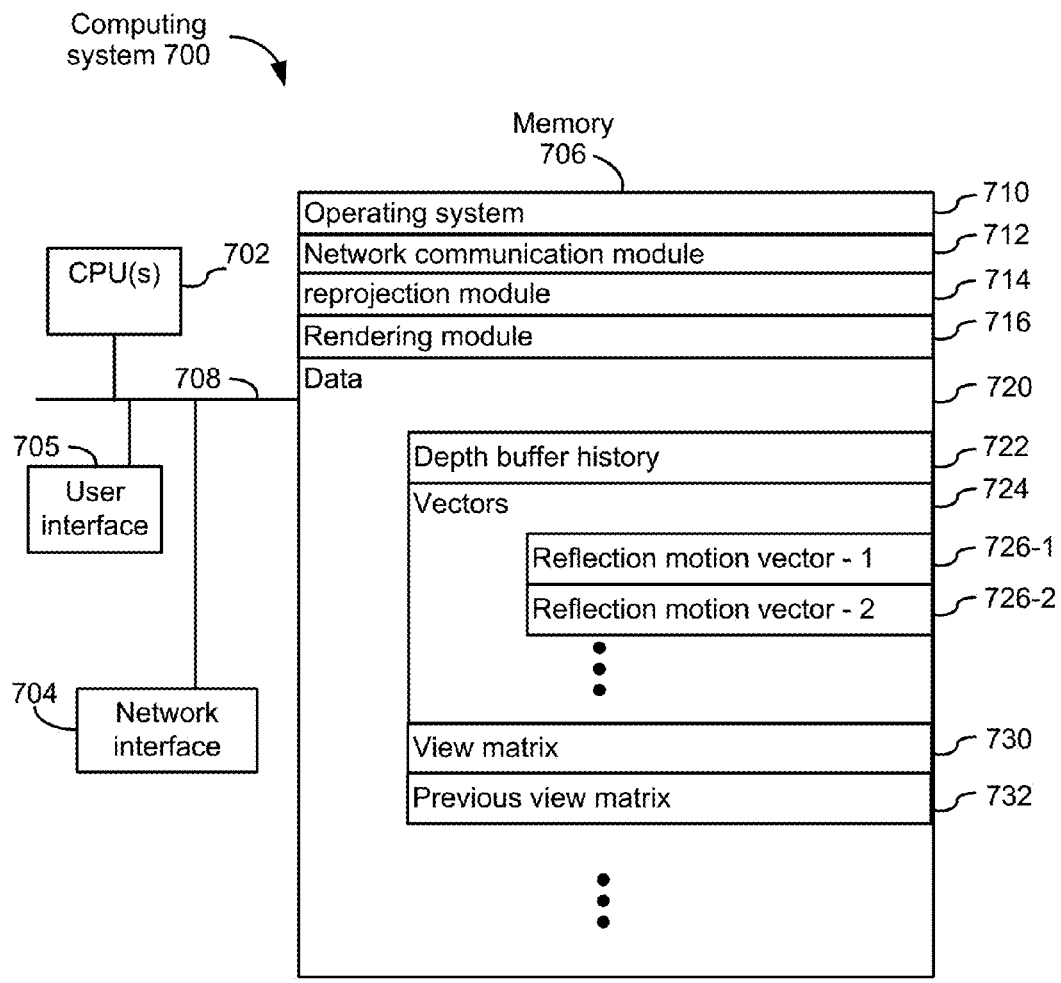
FIG. 7 is an example computing system for applying temporal reprojection to reflection data.

FIG. 7 illustrates an example computing system 700 for applying temporal reprojection to reflection data in accordance with some implementations.

The computing system 700 in some implementations includes one or more processing units CPU(s) 702 (also referred to as processors), one or more network interfaces 704, a user interface 705, a memory 706, and one or more communication buses 708 for interconnecting these components. The communication buses 708 optionally include circuitry (sometimes called a chipset) that interconnects and controls communications between system components. The memory 706 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706, or alternatively the non-volatile memory device (s) within the memory 706, comprises a non-transitory computer readable storage medium. In some implementations, the memory 706 or alternatively the non-transitory computer readable storage medium stores the following programs, modules and data structures, or a subset thereof:

- an operating system 710, which includes procedures for handling various basic system services and for performing hardware dependent tasks;
- a network communication module (or instructions) 712 for connecting the computing system 700 with other computing system (e.g., a server side rendering engine, or another client side rendering engine) via one or more network interfaces 704 (wired or wireless) or one or more communication network (e.g., a local area network or the Internet);
- a reprojection module 714 for applying temporal reprojection techniques to one or more pixels;
- a rendering module 716 for generating an image from pixel features or from 2-D or 3D models; and
- data 720 stored on the computing system 700, including:
    - a depth buffer history 722 for including a pixel's historical depth coordinates;
    - one or more vectors 724, which in some cases include:
        - one or more reflection motion vectors 726-i for describing different pixels' 3-dimensional movements, such as a motion vector for the reflection incident point and another motion vector for the reflected point;
    - a view matrix 730 for transforming objects from a world space to a view-space; and
    - a previous view matrix 732 for transforming previous positions of objects from a world space to a view-space.

In some implementations, the user interface 705 includes an input device (e.g., a keyboard, a mouse, a touchpad, a track pad, and a touch screen) for a user to interact with the computing system 700.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 706 optionally stores a subset of the modules and data structures identified above. Furthermore, the memory 706 may store additional modules and data structures not described above.

Although FIG. 7 shows a "computing system 700," FIG. 7 is intended more as functional description of the various features which may be present in computer systems than as a structural schematic of the implementations described herein. In practice, and as recognized by those of ordinary skill in the art, items shown separately could be combined and some items could be separated.

In the present disclosure, plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first vector could be termed a second vector, and, similarly, a second vector could be termed a first vector, without changing the meaning of the description, so long as all occurrences of the "first vector" are renamed consistently and all occurrences of the "second vector" are renamed consistently. The first vector and the second vector are both vectors, but they are not the same vector.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail. The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A non-transitory computer readable media storing computer executable program instructions, the program instructions including instructions executable to cause one or more processors to perform operations comprising:
    responsive to identifying an object and a reflection surface, wherein the reflection surface reflects an image of the object to a view point:
        identifying a reflection incidence point on a current position of the reflection surface and being associated with a point on the object being reflected to the view point;
        identifying a first surface motion vector associated with the reflection incidence point; and
        reprojecting the reflection incidence point using the first surface motion vector to determine a previous reflection incidence point associated with the point on the object, wherein the previous reflection incidence point is a reflection incidence point on a previous position of the reflection surface and being associated with the point on the object being reflected to the view point;
    identifying a second motion vector corresponding to a reflected point wherein the reflected point is a reflection of the object in accordance with the current position of the reflection surface;
    reprojecting the reflected point using the second motion vector to determine a previous location of the reflected point on the previous position of the reflection surface;
    projecting a current view point onto the previous position of the reflection surface to produce a previous view point;
    determining a presentation of the previous location of the reflected point on the previous position of the reflection surface; and
    presenting to a user the presentation of the previous location of the reflected point.

2. The non-transitory computer readable storage medium of claim 1, further comprising: determining the previous location of the reflected point on the previous position of the reflection surface in accordance with the previous view point and the previous location of the reflected point on the previous position of the reflection surface.

3. The non-transitory computer readable storage medium of claim 2, further comprising: determining the previous location of the reflected point on the previous position of the reflection surface using a Fermat's principal.

4. The non-transitory computer readable storage medium of claim 1, wherein reprojecting the reflection incidence point using the first surface motion vector to determine a previous reflection incidence point associated with the point on the object comprises: reprojecting the reflection incidence point using the first surface motion vector; and reconstructing the previous reflection incidence point using a depth buffer history.

5. The non-transitory computer readable storage medium of claim 1, wherein reprojecting the reflected point using the second motion vector to determine a previous location of the reflected point on the previous position of the reflection surface comprises: reconstructing the previous location of the reflected point using the depth buffer history.

6. The non-transitory computer readable storage medium of claim 1, further comprising: reconstructing a previous surface normal of the reflection incidence point using a previous view matrix transformation; and determining the previous position of the reflection surface using the previous surface normal of the reflection incidence point and the previous reflection incidence point.

7. The non-transitory computer readable storage medium of claim 1, wherein determining a presentation of the previous location of the reflected point on the previous position of the reflection surface comprises: evaluating the previous location of the reflected point in a previous reflection buffer using a previous view projection matrix.

8. The non-transitory computer readable storage medium of claim 1, wherein the view point is a camera position.

9. The non-transitory computer readable storage medium of claim 1, wherein the reflection surface is a screen space reflection surface.

10. The non-transitory computer readable storage medium of claim 1, wherein the operations are performed by a video game engine.

11. A method comprising:
    responsive to identifying an object and a reflection surface, wherein the reflection surface reflects an image of the object to a view point:
        identifying a reflection incidence point on a current position of the reflection surface and being associated with a point on the object being reflected to the view point;
        identifying a first surface motion vector associated with the reflection incidence point; and reprojecting the reflection incidence point using the first surface motion vector to determine a previous reflection incidence point associated with the point on the object, wherein the previous reflection incidence point is a reflection incidence point on a previous position of the reflection surface and being associated with the point on the object being reflected to the view point;

identifying a second motion vector corresponding to a reflected point wherein the reflected point is a reflection of the object in accordance with the current position of the reflection surface;

reprojecting the reflected point using the second motion vector to determine a previous location of the reflected point on the previous position of the reflection surface;

projecting a current view point onto the previous position of the reflection surface to produce a previous view point;

determining a presentation of the previous location of the reflected point on the previous position of the reflection surface; and presenting to a user the presentation of the previous location of the reflected point.

12. The method of claim 11, further comprising: determining the previous location of the reflected point on the previous position of the reflection surface in accordance with the previous view point and the previous location of the reflected point on the previous position of the reflection surface.

13. The method of claim 12, further comprising: determining the previous location of the reflected point on the previous position of the reflection surface using a Fermat's principal.

14. The method of claim 11, wherein reprojecting the reflection incidence point using the first surface motion vector to determine a previous reflection incidence point associated with the point on the object comprises: reprojecting the reflection incidence point using the first surface motion vector; and reconstructing the previous reflection incidence point using a depth buffer history.

15. The method of claim 11, wherein reprojecting the reflected point using the second motion vector to determine a previous location of the reflected point on the previous position of the reflection surface comprises: reconstructing the previous location of the reflected point using the depth buffer history.

16. The method of claim 11, further comprising: reconstructing a previous surface normal of the reflection incidence point using a previous view matrix transformation; and determining the previous position of the reflection surface using the previous surface normal of the reflection incidence point and the previous reflection incidence point.

17. The method of claim 11, wherein determining a presentation of the previous location of the reflected point on the previous position of the reflection surface comprises: evaluating the previous location of the reflected point in a previous reflection buffer using a previous view projection matrix.

18. The method of claim 11, wherein the view point is a camera position.

19. The method of claim 11, wherein the reflection surface is a screen space reflection surface.

20. The method of claim 11, wherein the operations are performed by a video game engine.

* * * * *